Sept. 21, 1926.  
I. M. KASS  
1,600,674  
MEANS FOR CEMENTITIOUS MOLDING  
Filed April 11, 1924
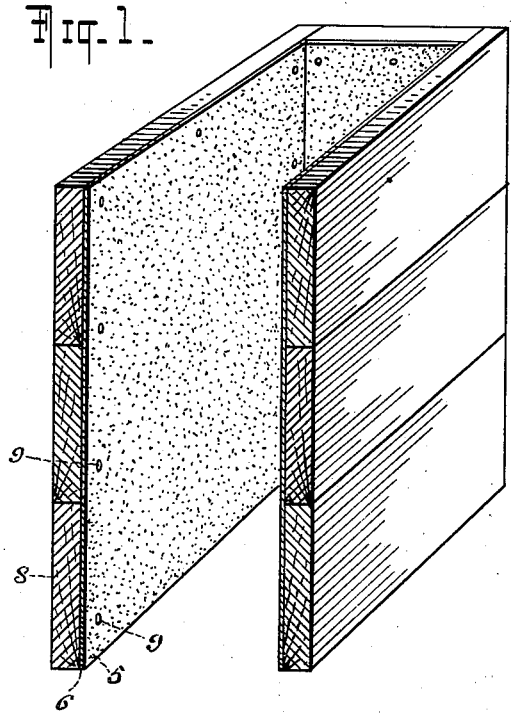
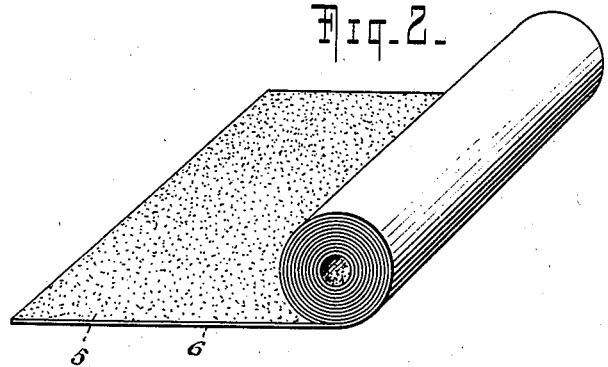
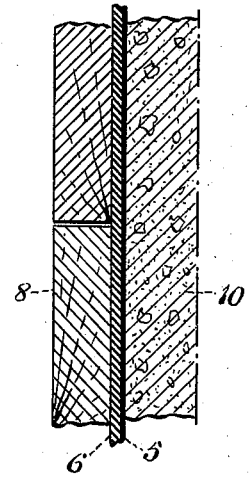
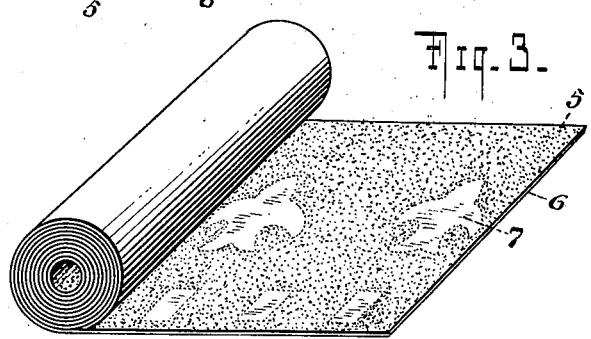
INVENTOR  
IRVING M. KASS  
BY  
ATTORNEYS Patented Sept. 21, 1926.

1,600,674

UNITED STATES PATENT OFFICE.

IRVING M. KASS, OF NEW YORK, N. Y.

MEANS FOR CEMENTITIOUS MOLDING.

Application filed April 11, 1924. Serial No. 705,739.

My invention relates to walls and other structures of concrete or equivalent cementitious material made by pouring the material into molds. A serious objection inherent in concrete walls or other equivalent structures produced in this way, is that when the concrete or other cementitious material has set and the mold is removed, the exposed surface of the wall exhibits the marks of the mold and thus presents an unsightly appearance. Usually this defect has been sought to be corrected after the concrete or its equivalent has set, an operation which obviously presents many difficulties and is time and labor consuming. It has also been proposed to use a material whereby the cementitious value of the cement used in the mixture is destroyed while the concrete or its equivalent is setting and hardening, and to thereby disintegrate the structure at said exposed surface and permit all marks of the mold to be easily obliterated and removed therefrom. Up to the present time, the difficulty with the last mentioned method has been to find a way whereby the same may be utilized in an efficient and economical manner and without labor difficulties.

The object of the present invention is to provide a novel arrangement whereby a cement destroying material or composition may be economically and efficiently used in combination with molds to disintegrate the exposed surface of the wall or other structure so that all marks left by the mold may be easily and quickly removed and so that a desirable finish may be readily imparted to the wall or other structure. Other more specific objects of the invention will appear from the description hereinafter and the features of novelty will be pointed out in the appended claims.

In the accompanying drawing, which illustrates an example of the invention without defining its limits, Fig. 1 is a sectional perspective of a mold with my invention combined therewith; Fig. 2 is a view showing one form of the invention; Fig. 3 is a similar view showing another form thereof, and Fig. 4 is an enlarged fragmentary section of the aforesaid mold.

It has heretofore been recognized that by bringing an organic material possessing the property of destroying the cementitious value of the cement into contact with the concrete or its equivalent while the same is setting, the concrete will be disintegrated to a predetermined extent at the points of contact. This leaves a certain proportion of the surface of the structure, which has been subjected to this treatment, in a condition to be easily removed whereby all traces of the molding operation which previously may have existed are obliterated. Up to the present time the methods of utilizing this treatment have involved labor difficulties and other objectionable features which have rendered the same prohibitive in many ways. The objectionable features inherent in said treatment up to the present time are overcome with my invention, which consists in applying an organic material possessing the necessary qualifications upon the surface of a suitable carrier or backing such as a building paper or a suitable fibrous material and then combining the treated carrier with a mold in such a manner that the organic material will be brought into contact with the concrete or its equivalent when the latter is poured into the mold. Thus as the setting of the concrete or its equivalent takes place, the aforesaid material destroys the cementitious value of the cement or binder and thereby disintegrates the structure upon that surface which is engaged by said material; the disintegrated surface material may be easily removed, whereby a desirable finish is imparted to the aforesaid surface and all traces or marks previously left by the mold are obliterated.

In the illustrated example the organic material 5 is applied to one surface of a suitable building paper 6, the application being carried out in any convenient manner as by printing or painting the material 5 upon said surface. The treated paper may be of any desirable dimensions and may be transported to the place of use in the form of rolls as shown in Fig. 2; if desired, the material 5 may be applied to the paper 6 in such a manner as to create a predetermined design 7 therein as shown in Fig. 3. The organic material may comprise any suitable substance having the desired properties such as casein, sugar or molasses and is generally applied to the carrier in the form of a paste; if desired, a suitable drier such as starch may be included in the paste to cause the same to quickly reach a dry condition. The drawing shows the invention being utilized in connection with the construction of a molded concrete wall, in which case a section or sections of the treated carrier or paper 6 is placed within the mold 8 in surface contact with that face thereof whereby the exposed surface of the wall is to be formed. The treated paper or other carrier 6 may be secured in place in the mold 8 in any convenient manner as by means of tacks or the like 9 and is positioned with its treated face exposed so that the material 5 will be exposed for contact with the concrete 10. The latter is poured or otherwise introduced into the mold 8 in any conventional way in the usual wet condition and the water therein dissolves the material 5 and brings it to a condition of activity. Thus as the setting of the concrete proceeds the material 5 will react to destroy the cementitious value of the cement or binder at the surface of the wall 10 and thereby will disintegrate the surface of the wall. The action of the material 5 penetrates to a sufficient distance to make the disintegration of the surface complete to a depth sufficient to permit the obliteration of mold marks and the like. After the concrete 10 has set, the mold 8 is removed in the customary manner and carries with it the paper or other carrier 6; if the latter should adhere to the face of the wall 10, it may be easily removed with the disintegrated concrete. The removal of the disintegrated concrete may be accomplished either manually or mechanically, for instance, by means of a wire or stiff fibre brush and leaves the exposed surface of the wall 10 in a condition free from any mold marks or other disfigurements and with a desirable finish; after the wall or its equivalent has been thus treated it has the appearance of a built up wall and does not in any way indicate that it is a poured wall. If the paper 6, provided with a design 7 as in Fig. 3, is used, a rough representation of the design will remain upon the surface of the wall after it has been brushed or otherwise treated to remove the disintegrated surface material; it is thus possible to give the wall an ornamental and distinctive appearance at will.

In addition to being useful in connection with the outside walls of a building the invention may be used in the construction of interior walls and partitions and by its action provides the wall or partition with the roughened surface which is necessary as a bond for the plaster or other finish for said walls or partitions; in this way, the scratch coat which is now required to provide such bond is done away with and only two coats of material are necessary where three were previously required. The invention obviously is useful also in many other ways.

The invention provides a simple and efficient means whereby a material or composition having cement destroying properties may be conveniently utilized and handled for disintegrating a surface of a molded wall or other structure for a predetermined purpose. The invention in its application does not require any skilled operators and does not involve any difficulties arising out of labor rules and regulations or labor organizations.

Various changes in the specific form shown and described may be made within the scope of the claims without departing from the spirit of my invention.

I claim:

1. The combination of a mold for cementitious material, a carrier located adjacent to a molding surface of said mold and a cement destroying composition carried by said carrier on that surface which is adapted for contact with the cementitious material when the mold is filled.

2. The combination of a mold for cementitious material, a fibre backing located in surface engagement with a molding surface of said mold and a cement destroying composition carried by said backing on that surface which is adapted for contact with the cementitious material when the mold is filled.

3. The combination of a mold for casting cementitious material into the form of a wall, a paper carrier located in surface engagement with an inner surface of said mold and a cement destroying composition carried by said paper in a manner to contact with said cementitious material at one surface of the wall formed thereby.

4. Means adapted for use in molds for molding cementitious material comprising a carrier of pliable material and a cement destroying composition carried by said carrier on that surface which is adapted for contact with the cementitious material when the mold is filled.

5. Means adapted for use in molds for molding cementitious material comprising a roll of building paper and a cement destroying composition carried by said paper on that surface which is adapted for contact with the cementitious material when the mold is filled.

6. Means adapted for use in molds for molding cementitious material comprising a carrier of pliable material and a cement destroying composition in the form of a predetermined design carried by said carrier on that surface which is adapted for contact with the cementitious material when the mold is filled.

7. The combination of a mold for casting cementitious material, a fibre carrier positioned contiguous to the inner surface of said mold, said carrier having a cement destroying composition on the surface thereof adapted to make contact with said cementitious material and means for temporarily securing said carrier to said mold to position it during the mold-filling operation and to permit of its removal after the mold has been opened.

In testimony whereof I have hereunto set my hand.

IRVING M. KASS.